US011110906B2

(12) United States Patent
Taneyhill et al.

(10) Patent No.: US 11,110,906 B2
(45) Date of Patent: Sep. 7, 2021

(54) PARKING BRAKE APPARATUS FOR A VEHICLE

(71) Applicant: Bendix Commercial Vehicle Systems LLC, Elyria, OH (US)

(72) Inventors: David J Taneyhill, Elyria, OH (US); Phillip J Kasper, Elyria, OH (US); Girish Barade, Westlake, OH (US); Christopher H Hutchins, Bay Village, OH (US); Thomas J Weed, North Ridgeville, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 241 days.

(21) Appl. No.: 16/214,671

(22) Filed: Dec. 10, 2018

(65) Prior Publication Data

US 2020/0180586 A1    Jun. 11, 2020

(51) Int. Cl.
| | |
|---|---|
| *B60T 17/18* | (2006.01) |
| *B60T 13/26* | (2006.01) |
| *B60T 13/68* | (2006.01) |
| *B60T 15/04* | (2006.01) |
| *B60T 13/74* | (2006.01) |

(52) U.S. Cl.
CPC ............ *B60T 17/18* (2013.01); *B60T 13/261* (2013.01); *B60T 13/686* (2013.01); *B60T 13/743* (2013.01); *B60T 13/745* (2013.01); *B60T 15/041* (2013.01); *B60T 2201/10* (2013.01); *B60T 2260/08* (2013.01); *B60T 2260/09* (2013.01); *B60T 2270/89* (2013.01)

(58) Field of Classification Search
CPC ........ B60T 13/22; B60T 13/26; B60T 13/261; B60T 13/268; B60T 13/662; B60T 13/665; B60T 13/686; B60T 13/743; B60T 13/745; B60T 17/12; B60T 17/18; B60T 15/041; B60T 2201/10; B60T 2260/08; B60T 2260/09; B60T 2270/89
USPC ................................. 303/13, 119.1, 158, 89
See application file for complete search history.

(56) References Cited

U.S. PATENT DOCUMENTS

| | | | |
|---|---|---|---|
| 4,892,014 A * | 1/1990 | Morell | .................... F16H 59/08 192/222 |
| 6,234,586 B1 | 5/2001 | Davis | |
| 7,644,996 B2 | 1/2010 | Bredin | |
| 7,887,144 B2 | 2/2011 | Braschel | |
| 9,150,208 B2 | 10/2015 | Schemmel | |
| 9,248,817 B2 | 2/2016 | Accardi | |

(Continued)

FOREIGN PATENT DOCUMENTS

| | | |
|---|---|---|
| CA | 2651403 A1 | 7/2019 |
| WO | WO2019008403 A1 | 1/2019 |

*Primary Examiner* — Robert A. Siconolfi
*Assistant Examiner* — San M Aung
(74) *Attorney, Agent, or Firm* — Cheryl Greenly; Brian Kondas; Eugene Clair (57) ABSTRACT

A parking brake apparatus is provided for a vehicle having components of a parking brake system and a number of devices providing a plurality of output signals indicative of a plurality of vehicle factors. The parking brake apparatus comprises an electronic controller arranged to (i) monitor the output signals indicative of a plurality of vehicle factors, and (ii) provide one or more control signals to be applied to components of the parking brake system to apply parking brakes based upon a predefined sequence of the plurality of vehicle factors having been met.

12 Claims, 5 Drawing Sheets

(56) References Cited

U.S. PATENT DOCUMENTS

| | | | |
|---|---|---|---|
| 2002/0023818 A1* | 2/2002 | Yanaka | B60T 13/662 |
| | | | 192/219.4 |
| 2003/0221922 A1* | 12/2003 | Callow | B60T 7/12 |
| | | | 188/265 |
| 2004/0026988 A1* | 2/2004 | Ewinger | B60T 13/741 |
| | | | 303/89 |
| 2004/0046443 A1* | 3/2004 | Jensen | B60T 7/045 |
| | | | 303/13 |
| 2004/0124697 A1* | 7/2004 | MacGregor | B60T 17/18 |
| | | | 303/89 |
| 2008/0061928 A1 | 3/2008 | Bennett | |
| 2008/0191546 A1 | 8/2008 | Plantamura | |
| 2011/0022283 A1 | 1/2011 | Lovell | |
| 2011/0256982 A1 | 10/2011 | Deblack | |
| 2015/0321654 A1 | 11/2015 | Si | |
| 2016/0001781 A1* | 1/2016 | Fung | B60K 28/02 |
| | | | 701/36 |
| 2016/0214556 A1 | 7/2016 | McGoldrick | |

* cited by examiner

LEGEND

0 - ARA Off = Warning Lamp off
              Post-Warning off
              Park Req off
1 - ARA Start = Warning Lamp off
2 - Conflict = Park Req on
3 - Pre-Warn = Warning Lamp on
4 - ARA Parking = Park Req on
5 - ARA Parked = Park Req off
6 - Failed Park = Park Req off
7 - Post-Warn = Post-Warn on
                Warning Lamp off

PARKING BRAKE APPARATUS FOR A VEHICLE

BACKGROUND

The present application relates to vehicle parking systems, and is particularly directed to a parking brake apparatus for a vehicle such as a truck.

Vehicle parking systems for trucks are known. One type of vehicle parking system for trucks is an electronic parking system. In some electronic parking systems, the parking brake cannot be applied unless a vehicle factor is met. For example, the parking brake cannot be applied unless the vehicle speed is detected to be zero. In some other electronic parking systems, the parking brake cannot be applied unless a multiple number of vehicle factors are met. Accordingly, those skilled in the art continue with research and development efforts in the field of vehicle parking systems including electronic parking systems in which the parking brake cannot be applied unless one or more vehicle factors are met.

SUMMARY

In accordance with one embodiment, a parking brake apparatus is provided for a vehicle having components of a parking brake system and a number of devices providing a plurality of output signals indicative of a plurality of vehicle factors. The parking brake apparatus comprises an electronic controller arranged to (i) monitor the output signals indicative of a plurality of vehicle factors, and (ii) provide one or more control signals to be applied to components of the parking brake system to apply parking brakes based upon a predefined sequence of the plurality of vehicle factors having been met.

In accordance with another embodiment, a parking brake apparatus is provided for a vehicle having components of a parking brake system and a number of devices providing a plurality of output signals indicative of a plurality of vehicle factors. The parking brake apparatus comprises an electronic controller arranged to (i) monitor the output signals indicative of a plurality of vehicle factors, and (ii) provide one or more control signals to be applied to components of the parking brake system to apply the parking brakes when a first one of the plurality of vehicle factors indicates that the vehicle is unparked and at least a second one and a third one of the plurality of vehicle factors have not been met.

In accordance with another embodiment, a parking brake apparatus is provided for a vehicle having components of a parking brake system. The parking brake apparatus comprises a plurality of vehicle factors and means for applying parking brakes based upon occurrence of the plurality of vehicle factors in a predefined sequence.

In accordance with yet another embodiment, a program storage medium readable by a computer having a memory is provided. The medium tangibly embodies one or more programs of instructions executable by the computer to perform method steps for processing signals of a vehicle having components of a parking brake system and a number of devices providing a plurality of output signals indicative of a plurality of vehicle factors. The method comprises the step of applying parking brakes based upon occurrence of at least some of the plurality of vehicle factors in a first predefined sequence and occurrence of at least some of the plurality of vehicle factors in a second predefined sequence that follows the first predefined sequence.

In accordance with still another embodiment, a parking brake apparatus is provided for a vehicle having components of a parking brake system and a number of devices providing a plurality of output signals indicative of a plurality of vehicle factors. The parking brake apparatus comprises a first device providing a first signal indicative of ground speed of the vehicle. The parking brake apparatus also comprises a second device providing a second signal indicative of the motive status of the vehicle powertrain. The parking brake apparatus further comprises an electronic controller arranged to automatically, without control by a vehicle driver, provide one or more control signals to be applied to components of the parking brake system to apply parking brakes when the first signal is indicative of zero ground speed of the vehicle and the second signal is indicative of the vehicle powertrain not being able to provide motive force.

DETAILED DESCRIPTION

The present application is directed to a parking brake apparatus for a vehicle such as a truck. The specific construction of the parking brake apparatus may vary. It is to be understood that the disclosure below provides a number of embodiments or examples for implementing different features of various embodiments. Specific examples of components and arrangements are described to simplify the present disclosure. These are merely examples and are not intended to be limiting.

Figure 1:
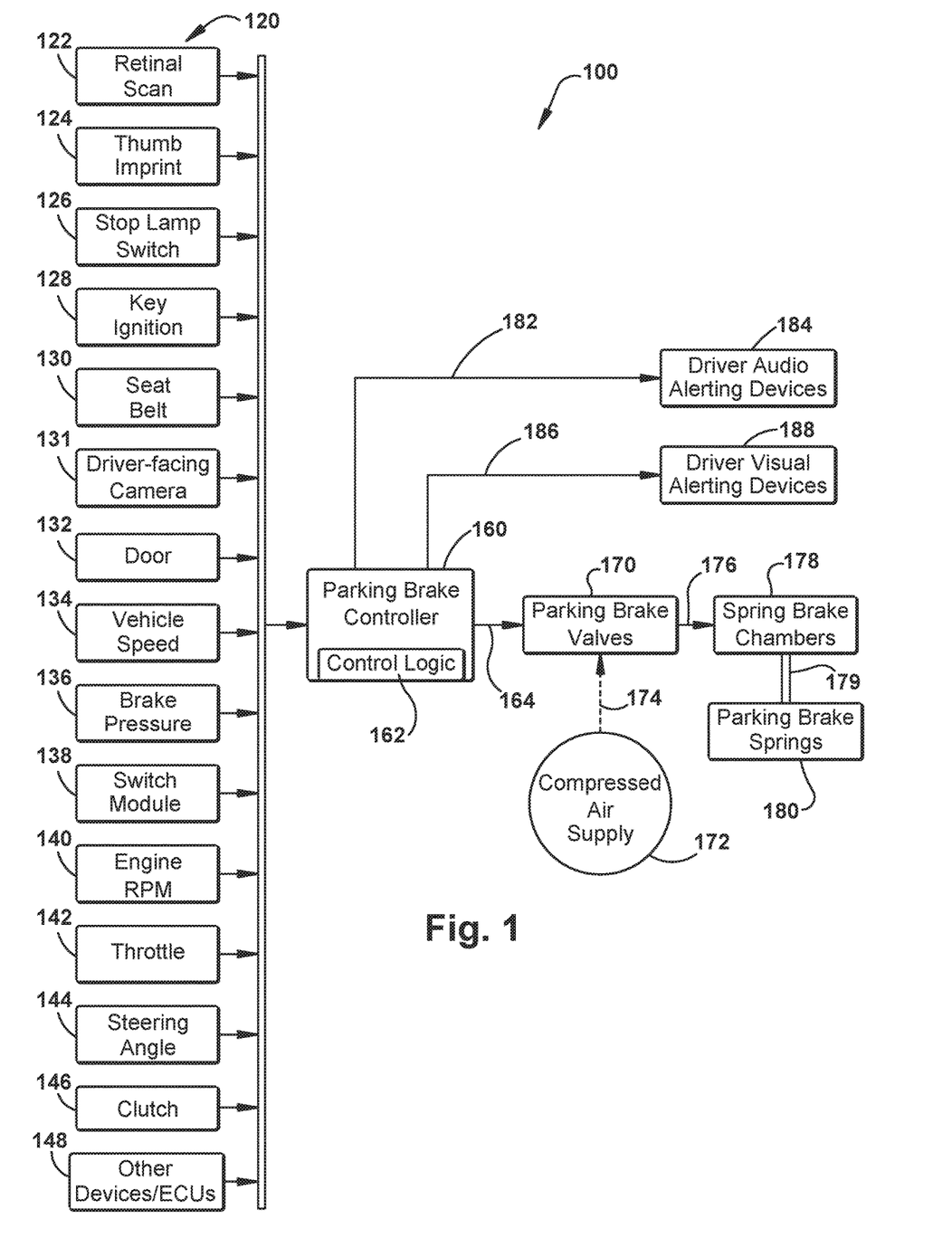
FIG. 1 is a schematic block diagram showing an example parking brake apparatus constructed in accordance with an embodiment.

Referring to FIG. 1, a schematic block diagram showing an example parking brake apparatus constructed in accordance with an embodiment is illustrated. In FIG. 1, electrical line connections are shown as solid lines, pneumatic lines connections are shown as dashed lines, and mechanical couplings are shown as double solid lines.

Parking brake apparatus 100 includes a number of devices 120 that provide a plurality of output signals indicative of a corresponding plurality of vehicle factors. More specifically, the devices 120 include but are not limited to driver biometric measurement devices, such as a retinal scanner 122 or a thumb imprint scanner 124, a stop lamp switch 126, a key ignition switch 128, a vehicle seat belt switch 130, a driver-facing camera 131, a vehicle door switch 132, a vehicle speed sensor 134, a brake pressure sensor 136, a switch module 138, an engine RPM sensor 140 or other sensor indicating the motive status of the vehicle powertrain (e.g., whether or not the vehicle powertrain is able to provide motive force), a throttle position sensor 142, a steering angle sensor 144, a clutch position sensor 146, and other devices or electronic controller units (ECUs) 148. As an example, the other devices may comprise a global positioning system (GPS) device which can provide information regarding a change in position of the vehicle or an accelerometer for indicating a change in acceleration of the vehicle.

Each of the output signals from the devices 120 is indicative of a corresponding vehicle factor. In particular, the output signal from the retinal scanner 122 is indicative of validity of the identity of the vehicle driver based upon a scan of the driver's retina. The output signal from the thumb imprint scanner 122 is indicative of validity of the identity of the vehicle driver based upon a scan of the driver's thumb print. The output signal from the stop lamp switch 126 is indicative of whether the vehicle driver's foot is on the foot brake pedal. The output signal from the key ignition switch 128 is indicative of whether the ignition is on.

The output signal from the vehicle seat belt switch 130 is indicative of whether the vehicle driver's seat belt is buckled. The output signal from the driver-facing camera 131 is indicative of validity of the identity of the vehicle driver based upon a captured camera-image of the driver. The output signal from the vehicle door switch 132 is indicative of whether the vehicle driver's door is closed. The output signal from the vehicle speed sensor 134 is indicative of ground speed of the vehicle. The vehicle speed sensor 134 may comprise a wheel speed sensor, for example. The output signal from the brake pressure sensor 136 is indicative of whether the vehicle driver is depressing the foot brake pedal. The output signal from the switch module 138 is indicative of a driver's intent to change the park state of the vehicle.

The output signal from the engine RPM sensor 140 is indicative of the revolutions per minute of the vehicle engine. The output signal from the throttle position sensor 142 is indicative of the extent that the vehicle driver is depressing the foot accelerator pedal. The output signal from the steering angle sensor 144 is indicative of the angular extent to which the vehicle driver is turning the vehicle steering wheel. The output signal from the clutch position sensor 146 is indicative of the extent to which the vehicle driver is depressing the foot clutch. The output signals from the other devices 148 are from other sources such as electronic controller units (ECUs) associated with the vehicle.

Parking brake apparatus 100 also includes a parking brake controller 160 in the form of an electronic controller unit that is arranged to monitor the output signals from the devices 120 indicative of the plurality of vehicle factors. The devices 120 may be hardwired or communicate via a controller area network (CAN) bus, or a combination of both, to the parking brake controller 160. The parking brake controller 160 provides one or more control signals based upon control logic 162 that is stored in a data storage unit of the parking brake controller 160. More specifically, parking brake controller 160 provides signals on line 164 to control operation of parking brake valves 170. Compressed air supply 172 provides a source of compressed air in line 174 to parking brake valves 170. Parking brake valves 170 are controlled by parking brake controller 160 to vary pneumatic pressure in line 176 to one or more chambers of spring brake chambers 178.

More specifically, when the parking brakes of the vehicle are applied, the parking brake controller 160 provides signals on line 164 that are applied to parking brake valves 170 so as to exhaust air in one or more chambers of spring brake chambers 178. The spring brake chambers 178 are operatively coupled via line 179 in known manner to parking brake springs 180. When air in spring brake chambers 178 is exhausted and system air pressure drops to less than about 45 psi to 60 psi, parking brake springs 180 are activated to apply the vehicle parking brakes, as is known. Structure and operation of parking brake controller 160 and parking brake valves 170 for controlling operation of spring brake chambers 178 and parking brake springs 180 of the vehicle are conventional and, therefore, will not be further described.

Parking brake controller 160 also provides a number of signals on line 182 to a number of driver audio alerting devices 184, and a number of signals on line 186 to a number of driver visual alerting devices 188. Other types of devices for alerting the vehicle driver are possible. For example, haptic or audio devices may be used to alert the vehicle driver.

In accordance with an aspect of the present disclosure, the parking brake controller 160 monitors the output signals from the devices 120 and provides one or more control signals to be applied to components of the parking brake system to apply the parking brakes based upon at least one predefined sequence of the plurality of output signals having been met (i.e., at least one predefined sequence being valid). A valid predefined sequence may comprise a predefined sequence of events on the CAN bus indicating that the vehicle is in a state that is ready for the vehicle parking brakes to be applied. Alternatively, or in addition to, a valid predefined sequence may comprise a number of discrete vehicle inputs indicating that the vehicle is in a state that is ready for the vehicle parking brakes to be applied.

In some embodiments, the predefined sequence of the plurality of vehicle factors comprises occurrence of one or more vehicle interlocks being met followed by occurrence of two or more vehicle interlocks being met.

In some embodiments, the electronic controller 160 is arranged to provide a pre-warning to a driver of the vehicle when a first one of the plurality of vehicle factors indicates that the vehicle is unparked and at least a second one of the plurality of vehicle factors has not been met. The pre-warning to the driver of the vehicle may be in the form of a warning lamp (e.g., one of the driver visual alerting devices 188 shown in FIG. 1) for the driver to visualize.

In some embodiments, the electronic controller is arranged to apply the parking brakes when a first one of the plurality of vehicle factors indicates that the vehicle is unparked and at least a second one and a third one of the plurality of vehicle factors have not been met. The electronic controller 160 may also be arranged to provide a post-warning to the driver of the vehicle after the parking brakes are applied in response to the first one of the plurality of vehicle factors indicating that the vehicle is unparked and the at least the second one and the third one of the plurality of vehicle factors having not been met. The electronic controller 160 may be further arranged to provide a post-warning to the driver of the vehicle after the vehicle fails to park in response to the parking brakes being applied a predefined maximum number of tries in attempt to park the vehicle. The post-warning to the driver of the vehicle may be in the form of warning lamp for the driver to visualize.

In some embodiments, the electronic controller is arranged to infer that the vehicle is stationary when vehicle speed is determined to be below a predefined threshold speed and a vehicle shutdown sequence is determined to be valid. The electronic controller may be arranged to assume that any missing output signal is indicative of the corresponding vehicle factor being not met.

Figure 2:
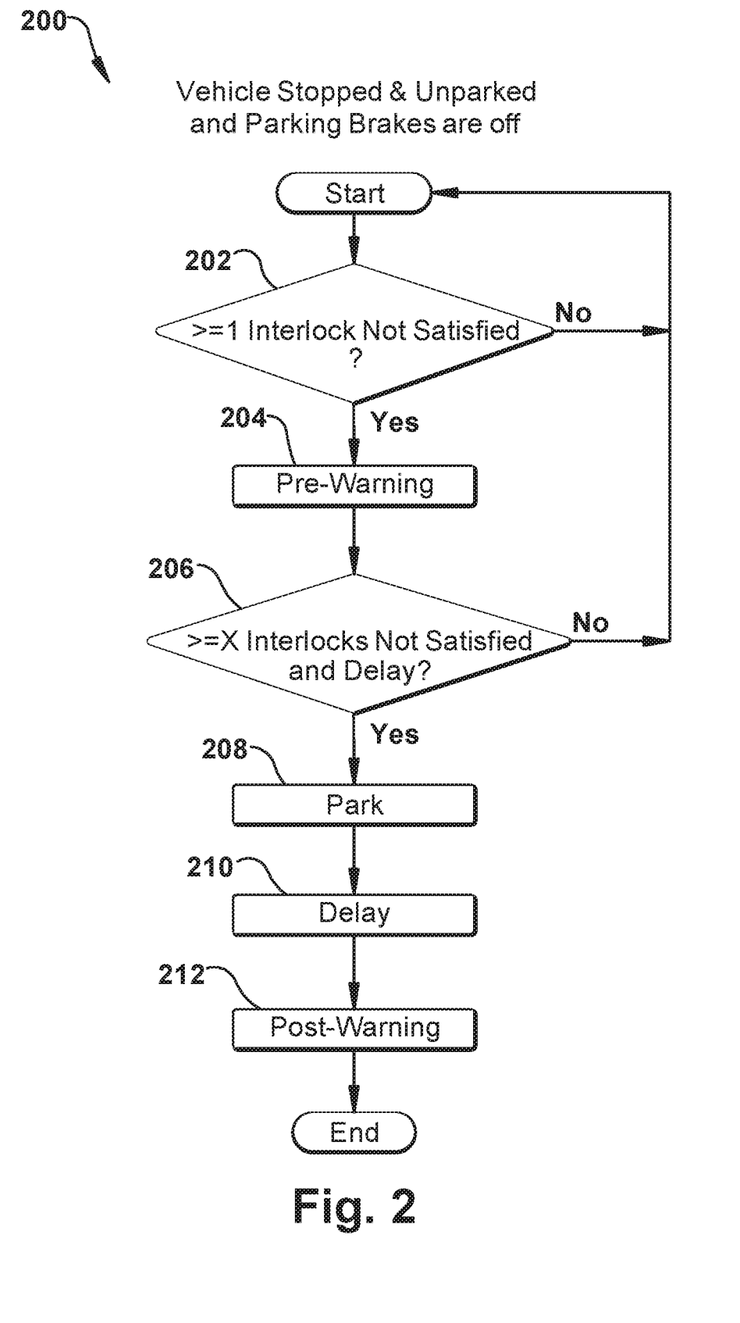
FIG. 2 is a flow diagram depicting an example method of operating the parking brake apparatus of FIG. 1 in accordance with an embodiment.

Referring to FIG. 2, a flow diagram 200 depicting an example method of operating the parking brake apparatus 100 in accordance with an embodiment is illustrated. Initially, when the vehicle is stopped and unparked, the vehicle parking brakes are off (i.e., in the released position). In block 202, the parking brake controller 160 monitors the output signals from the devices 120 and makes a determination as to whether one or more interlocks (i.e., one or more vehicle factors) are satisfied (i.e., met). If the determination in block 202 is negative (i.e., one or more vehicle factors are not met), the process continues to monitor the output signals from the devices 120 indicative of vehicle factors. However, if the determination in block 202 is affirmative (i.e., one or more vehicle factors are met), the process proceeds to block 204.

In block 204, the parking brake controller 160 provides one or more signals on line 182 to the driver audio alerting devices 184 or on line 186 to the driver visual alerting devices 188 to provide the vehicle driver with a pre-warning. The parking brake system is in a "pre-warning" state. The process then proceeds to block 206. In block 206, after a predefined time delay, a determination is made as to whether "X" or more interlocks (i.e., "X" or more vehicle factors where X is an integer greater than one) are not satisfied. If the determination in block 206 is negative (i.e., the criteria of block 206 has not been met), the process returns back to block 202 to continue monitoring the output signals from the devices 120 indicative of vehicle factors. However, if the determination in block 206 is affirmative (i.e., the criteria of block 206 has been met), the process proceeds to block 208.

In block 208, the parking brake controller 160 provides one or more control signals to components of the parking brake system including the parking brake valves 170 to apply the vehicle parking brakes. The parking brake system is in a "parked" state. Then, as shown in block 210, after a predefined time delay (which may be the same as the predefined time delay back in block 206), the process proceeds to block 212. In block 212, the parking brake controller 160 provides one or more signals on line 182 to the driver audio alerting devices 184 or on line 186 to the driver visual alerting devices 188 to provide the vehicle driver with a post-warning. The parking brake system is in a "post-warning" state. The process then ends.

Figure 3A:
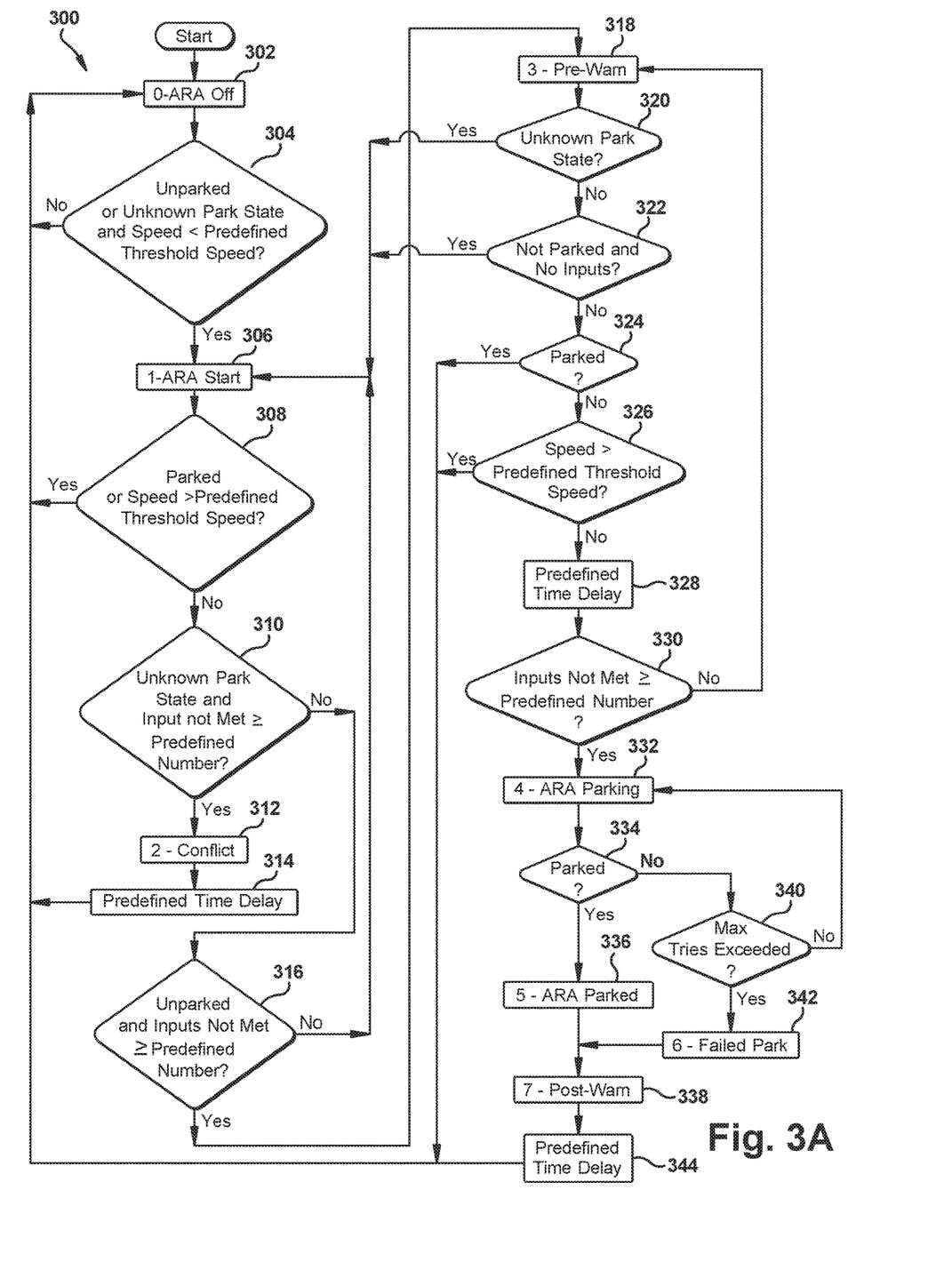
FIGS. 3A and 3B are a flow diagram depicting an example method of operating the parking brake apparatus of FIG. 1 in accordance with another embodiment.
Figure 3B:
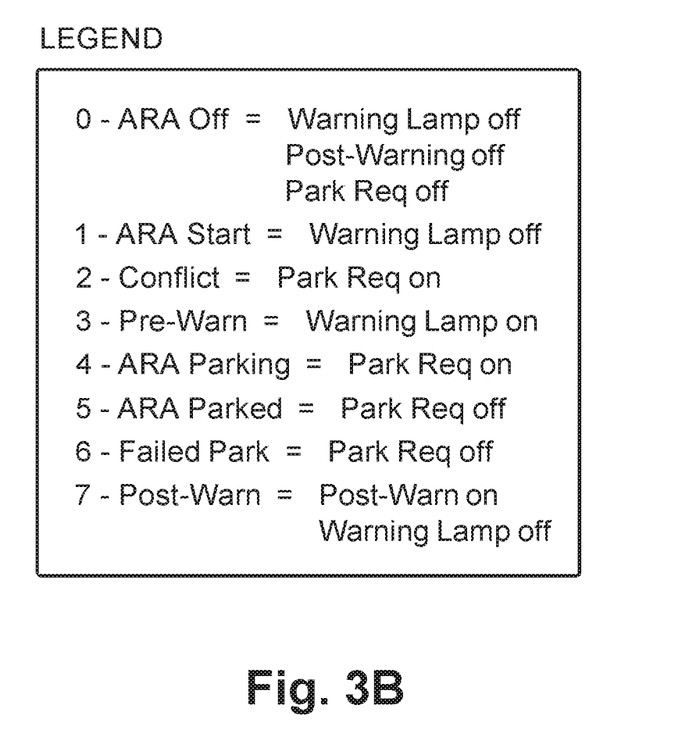

Referring to FIGS. 3A and 3B, a flow diagram 300 depicting an example method of operating the parking brake apparatus 100 of FIG. 1 in accordance with another embodiment is illustrated. In the embodiment of FIGS. 3A and 3B, the feature of applying the vehicle parking brakes is referred to herein as the "anti-rollaway" (ARA) feature. When the vehicle is stopped and unparked, the ARA feature is in the off state, as shown in block 302. When the ARA feature is in the off state, warning lamp is off, post-warning is off, and park request is off, as shown in the legend of FIG. 3B. In block 304, a determination is made as to whether the vehicle is unparked or in an unknown park state and the vehicle speed is less than a predefined threshold speed (e.g., three miles per hour (mph)).

If the determination in block 304 is negative (i.e., the criteria of block 304 has not been met), the ARA feature remains off and the parking brake controller 160 continues to monitor the output signals from the devices 120 indicative of vehicle factors. However, if the determination in block 304 is affirmative (i.e., the criteria of block 304 has been met), the process proceeds to block 306 in which the ARA feature is in a start state. When the ARA feature is in the start state, warning lamp is off, as shown in the legend of FIG. 3B.

Then, in block 308, a determination is made as to whether the vehicle is parked or the vehicle speed is greater than a predefined threshold speed (e.g., three mph). If the determination in block 308 is affirmative (i.e., the criteria of block 308 has been met), the ARA feature remains off and the parking brake controller 160 continues to monitor the output signals from the devices 120 indicative of vehicle factors. However, if the determination in block 308 is negative (i.e., the criteria of block 308 has not been met), the process proceeds to block 310.

In block 310, a determination is made as to whether the vehicle is in an unknown park state and the number of vehicle factors that have not been met is greater or equal to a predefined number (e.g., a predefined number of one). If the determination in block 310 is affirmative (i.e., the criteria of block 310 has been met), the process proceeds to block 312 indicating that the vehicle parking system is in a conflict state. When the ARA feature is in the conflict state, park request is on, as shown in the legend of FIG. 3B. After a predefined time delay (e.g., five seconds) as indicated in block 314, the ARA feature remains off and the parking brake controller 160 continues to monitor the output signals from the devices 120 indicative of vehicle factors. However, if the determination in block 310 is negative (i.e., the criteria of block 310 has not been met), the process proceeds to block 316.

In block 316, a determination is made as to whether the vehicle is unparked and the number of vehicle factors that have not been met is greater than or equal to a predefined number (e.g., a predefined number of one). If the determination in block 316 is negative (i.e., the criteria of block 316 has not been met), the process returns back to block 306 in which the ARA feature is in the start state. However, if the determination in block 316 is affirmative (i.e., the criteria of block 316 has been met), the process proceeds to block 318.

In block 318, the parking brake controller 160 provides one or more signals on line 182 to the driver audio alerting devices 184 or on line 186 to the driver visual alerting devices 188 to provide the vehicle driver with a pre-warning. The ARA feature is in a pre-warn state. When the ARA feature is in the pre-warn state, warning lamp is on, as shown in the legend of FIG. 3B. The process then proceeds to block 320. In block 320, a determination is made as to whether the vehicle is in an unknown park state. If the determination is affirmative (i.e., the vehicle is in an unknown park state), the process returns back to block 306 in which the ARA feature is in the start state. However, if the determination in block 320 is affirmative (i.e., the vehicle is in an unknown park state), the process proceeds to block 322.

In block 322, a determination is made as to whether the vehicle is not in the parked state and there are no vehicle factor inputs that are present. If the determination is affirmative (i.e., the criteria of block 322 has been met), the process returns back to block 306 in which the ARA feature is in the start state. However, if the determination in block 322 is negative (i.e., the criteria of block 322 has not been met), the process proceeds to block 324.

In block 324, a determination is made as to whether the vehicle is in the parked state. If the determination is affirmative (i.e., the vehicle is in the parked state), the process returns back to block 302 in which the ARA feature is in the off state. However, if the determination in block 324 is negative (i.e., the vehicle is not in the parked state), the process proceeds to block 326.

In block 326, a determination is made as to whether the vehicle speed is greater than a predefined threshold speed (e.g., three mph). If the determination is affirmative (i.e., the vehicle speed is greater than the predefined threshold speed), the process returns back to block 302 in which the ARA feature is in the off state. However, if the determination in block 326 is negative (i.e., the vehicle speed is not greater than the predefined threshold speed), the process proceeds to block 328.

After a predefined time delay (e.g., three seconds) as shown in block 328, the process proceeds to block 330 in which a determination is made as to whether the number of vehicle factors that have not been met is greater than or equal to a predefined number (e.g., a predefined number of two). If the determination is negative (i.e., the criteria of block 330 has not been met), the process returns back to block 318 in which the ARA feature is in the pre-warn state. However, if the determination in block 330 is affirmative (i.e., the criteria of block 330 has been met), the process proceeds to block 332 indicating that the ARA feature is in a parking state. When the ARA feature is in the parking state, park request is on, as shown in the legend of FIG. 3B.

Then, in block 334, a determination is made as to whether the vehicle is in a parked state. If the determination in block 334 is affirmative (i.e., the vehicle is in the parked state), the process proceeds to block 336 indicating that the ARA feature is in the parked state before proceeding to block 338. When the ARA feature is in the parked state, park request is off, as shown in the legend of FIG. 3B. However, if the determination in block 334 is negative (i.e., the vehicle is not in the parked state), the process proceeds to block 340.

In block 340, a determination is made as to whether a predefined maximum number of tries in attempt to park the vehicle has been exceeded. If the determination in block 340 is negative (i.e., the predefined maximum number of tries in attempt to park the vehicle has not been exceeded), the process returns back to block 332 in which the ARA feature is in the parking state. However, if the determination is block 340 is affirmative (i.e., the predefined maximum number of tries in attempt to park the vehicle has been exceeded), the process proceeds to block 342 indicating that the ARA feature is in a failed park state before proceeding to block 338. When the ARA feature is in the failed state, park request is off, as shown in the legend of FIG. 3B.

In block 338, the parking brake controller 160 provides one or more signals on line 182 to the driver audio alerting devices 184 or on line 186 to the driver visual alerting devices 188 to provide the vehicle driver with a post-warning. The ARA feature is in a post-warn state. When the ARA feature is in the post-warn state, warning lamp is on and post-warning is on, as shown in the legend of FIG. 3B. Then, after a predefined time delay (e.g., three seconds) as shown in block 344, the process proceeds back to block 302 in which the ARA feature is in the off state.

Figure 4:
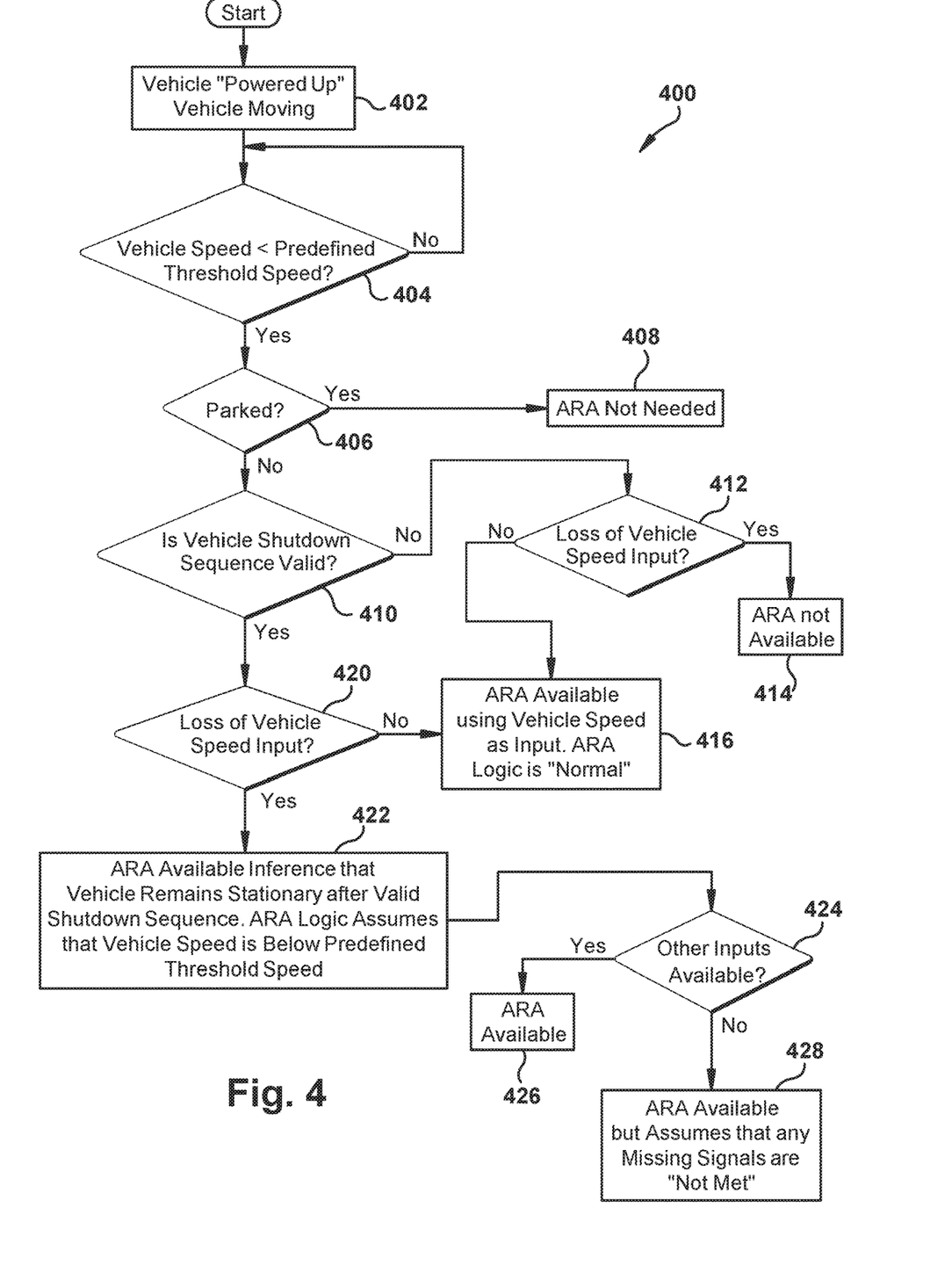
FIG. 4 is a flow diagram depicting an example method of operating the parking brake apparatus of FIG. 1 in accordance with yet another embodiment.

Referring to FIG. 4, a flow diagram 400 depicting an example method of operating the parking brake apparatus 100 in accordance with yet another embodiment is illustrated. The vehicle is initially moving and "powered up", as shown in block 402. A determination is made in block 404 as to whether the vehicle speed is less than a predefined threshold speed (e.g., a speed between three and five mph). If the determination in block 404 is negative (i.e., the vehicle speed is not less than the predefined threshold speed), the process continues to monitor the vehicle to determine if the vehicle speed is less than the predefined threshold speed. However, if the determination in block 404 is affirmative (i.e., the vehicle speed is less than the predefined threshold speed), the process proceeds to block 406.

In block 406, a determination is made as to whether the vehicle is parked. If the determination in block 406 is affirmative (i.e., the vehicle is parked), then the ARA feature (as discussed hereinabove with reference to FIGS. 3A and 3B) is not needed as indicated in block 408. However, if the determination in block 406 is negative (i.e., the vehicle is not parked), the process proceeds to block 410.

In block 410, a determination is made as to whether a vehicle shutdown sequence is valid. A vehicle shutdown sequence is not a complete loss of vehicle signals, but rather is a discernable shutdown sequence of signals. For example, the engine RPM device 140 (FIG. 1) initially provides a signal indicative of operating engine RPM speed, then a signal indicative of it slowing down, and then a signal indicative of the engine RPM being zero to provide a valid shutdown of the vehicle. In this example, valid data signals are being provided on the CAN bus, but eventually drops off of the CAN bus.

The vehicle shutdown sequence in block 410 may comprise signals other than for engine RPM status. Other types of signals for a vehicle shutdown sequence are possible. For example, the vehicle shutdown sequence may comprise signals indicative of vehicle transmission status, vehicle powertrain status, or vehicle brake system status. In block 410, the validity of one or more vehicle shutdown sequences can be determined. In this case, if data transmission stops for one type of signal (e.g., vehicle engine RPM status), then validity of a vehicle shutdown sequence could still be determined based upon another type of signal (e.g., vehicle transmission status).

If the determination in block 410 is negative (i.e., a vehicle shutdown sequence is not valid), the process proceeds to block 412 in which a determination is made as to whether one or more signals indicative of vehicle speed is loss (i.e., not present). If the determination in block 412 is affirmative (i.e., there has been a loss of vehicle speed input), then the ARA feature is not available as indicated in block 414. However, if the determination in block 412 is negative (i.e., there has not been a loss of vehicle speed input), then the ARA feature is available using vehicle speed as an input with the ARA logic functioning as normal as indicated in block 416.

However, if the determination back in block 410 is affirmative (i.e., a vehicle shutdown sequence is valid), the process proceeds to block 420 in which a determination is made as to whether one or more signals indicative of vehicle speed is loss (i.e., not present). If the determination in block 420 is negative (i.e., there has not been a loss of vehicle speed input), then ARA feature is available using vehicle speed as an input with the ARA logic functioning as normal as indicated in block 416. However, if the determination in block 420 is affirmative (i.e., there has been a loss of vehicle speed input), then process proceeds to block 422.

As shown in block 422, the ARA feature is available based on an inference that the vehicle remains stationary after a valid shutdown sequence (as was determined back in block 410). In this case, the ARA logic assumes that the vehicle speed is below a predefined threshold speed (as was determined back in block 404) even though there has been a loss of vehicle speed input (as was determined back in block 420). The process then proceeds to block 424.

A determination is made in block 424 as to whether there are other vehicle inputs (i.e., other vehicle factors) that are available to be processed by the ARA logic. If the determination in block 424 is affirmative (i.e., there are other vehicle inputs available to be processed by the ARA logic), then the ARA feature is available using these other vehicle inputs for the ARA logic. However, if the determination in block 424 is negative (i.e., there are no other vehicle inputs available to be processed by the ARA logic), then the ARA feature is available but the ARA logic makes an assumption that any missing vehicle input signal (i.e., any missing vehicle factor) is considered a vehicle factor not being met.

It should be apparent that the above-described parking brake apparatus 100 provides a parking brake system in which the parking brakes can be applied automatically (i.e., without control by the vehicle driver) to prevent the vehicle from rolling away when the vehicle driver should have but forgot to apply the parking brakes. The vehicle is stationary (i.e., the vehicle speed is zero) and there is one or more signals indicative of the vehicle powering down and therefore indicative of the vehicle driver desiring the vehicle to remain stationary. The one or more signals indicative of the vehicle powering down include, for examples, engine RPM status at zero speed, key ignition off, driver's seat belt unbuckled, and driver's door opened. It should be noted that when the vehicle is not parked, the parking controller 160 (FIG. 1) remains awake even though other electronic controller units (not shown) may be powering down. Also, data loss is not considered to be a point of power down for the parking controller 160.

It should also be apparent that the above-described parking brake apparatus 100 provides a parking brake system in which the parking brakes can be applied based upon at least one predefined sequence of the plurality of output signals from the devices 120 having been met and thereby based upon at least one predefined sequence of the plurality of vehicle factors having been met. For example, in the embodiment shown in FIG. 2, the determination in block 202 if one or more vehicle interlocks are met is followed in sequence by the determination in block 206 if two or more vehicle interlocks are met. Also, the pre-warning of block 204 is followed by the post-warning of block 212. The pre-warning is provided when a first one of the plurality of vehicle factors indicates that the vehicle is unparked and at least a second one of the plurality of vehicle factors has not been met. The post-warning is provided after the parking brakes are applied in response to the first one of the plurality of vehicle factors indicating that the vehicle is unparked and the at least the second one and at least a third one of the plurality of vehicle factors having not been met.

The plurality of vehicle factors are selected from retinal scan status, thumb imprint status, stop lamp switch status, key ignition switch status, seat belt status, driver-facing camera status, door status, vehicle speed status, brake pressure switch status, switch module status, engine RPM status, throttle position status, steering angle status, clutch position status, and electronic controller unit status. These are only example vehicle factors. Other vehicle factors are possible. As an example, a lateral acceleration device providing an output signal indicative of vehicle yaw or a longitudinal acceleration device providing an output signal indicative of vehicle pitch may be used as vehicle factors. Any combination of devices may be used.

It should also be apparent that the above-described parking brake apparatus 100 provides a parking brake system in which the parking brakes are applied based upon occurrence of at least some of the plurality of vehicle factors in a first predefined sequence and occurrence of at least some of the plurality of vehicle factors in a second predefined sequence that follows the first predefined sequence. For example, in the embodiment shown in FIGS. 3A and 3B, the determination in block 304 is followed in sequence by the determination in block 308 which, in turn, is followed in sequence by the determination in block 310. As another example, in the embodiment shown in FIG. 4, the determination in block 404 is followed in sequence by the determination in block 410 which, in turn, is followed in sequence by the determination in block 420.

It should further be apparent that the above-described parking apparatus 100 provides a parking brake system in which the application of the vehicle parking brakes is based upon a prioritization of vehicle interlocks (i.e., vehicle factors), and not based upon a requirement that all of the vehicle interlocks be satisfied. By providing a vehicle parking brake system in which the application of the vehicle parking brakes is based upon a prioritization of vehicle interlocks, potential vehicle downtime can be avoided. Also, non-operation of the vehicle under certain conditions can be avoided.

Program instructions for enabling the parking brake controller 160 shown in FIG. 1 to perform operation steps in accordance with flow diagram 200 shown in FIG. 2, flow diagram 300 shown in FIGS. 3A and 3B, or flow diagram 400 shown in FIG. 4, may be embedded in memory internal to parking brake controller 160. Alternatively, or in addition to, program instructions may be stored in memory external to parking brake controller 160. As an example, program instructions may be stored in memory internal to a different electronic controller unit of the vehicle. Program instructions may be stored on any type of program storage media including, but not limited to, external hard drives, flash drives, and compact discs. Program instructions may be reprogrammed depending upon features of the particular electronic controller unit.

Aspects of disclosed embodiments may be implemented in software, hardware, firmware, or a combination thereof. The various elements of the system, either individually or in combination, may be implemented as a computer program product tangibly embodied in a machine-readable storage device for execution by a processor. Various steps of embodiments may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed embodiments can be loaded onto a computer.

Although the above description describes use of one electronic controller unit, it is conceivable that any number of electronic controller units may be used. Moreover, it is conceivable that any type of electronic controller unit may be used. Suitable electronic controller units for use in vehicles are known and, therefore, have not been described. Accordingly, the program instructions of the present disclosure can be stored on program storage media associated with one or more vehicle electronic controller units.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A parking brake apparatus for a vehicle having components of a parking brake system and a number of devices providing a plurality of output signals indicative of a plurality of vehicle factors, the parking brake apparatus comprising:

an electronic controller arranged to (i) monitor the output signals indicative of a plurality of vehicle factors, (ii) provide one or more control signals to be applied to components of the parking brake system to temporarily apply parking brakes to activate an anti-rollaway feature based upon a predefined sequence of the plurality of vehicle factors having been met, (iii) infer that the vehicle is stationary when vehicle speed is determined to be below a predefined threshold speed and a vehicle shutdown sequence is determined to be valid, (iv) provide a post-warning to the driver of the vehicle after the vehicle fails to park in response to a predefined maximum number of tries in attempt to park the vehicle being unsuccessful and (iv) discontinue the post-warning after a predefined time delay.

2. A parking brake apparatus according to claim 1, wherein the predefined sequence of the plurality of vehicle factors comprises occurrence of one or more vehicle interlocks being met followed by occurrence of two or more vehicle interlocks being met.

3. A parking brake apparatus according to claim 1, wherein the electronic controller is arranged to provide a pre-warning to a driver of the vehicle when a first one of the plurality of vehicle factors indicates that the vehicle is unparked and at least a second one of the plurality of vehicle factors has not been met.

4. A parking brake apparatus according to claim 3, wherein the pre-warning to the driver of the vehicle is in the form of a warning lamp for the driver to visualize, a haptic signal, or an audible signal.

5. A parking brake apparatus according to claim 1, wherein the electronic controller is arranged to assume that any missing output signal is indicative of the corresponding vehicle factor being not met.

6. A parking brake apparatus for a vehicle having components of a parking brake system and a number of devices providing a plurality of output signals indicative of a plurality of vehicle factors, the parking brake apparatus comprising:
an electronic controller arranged to (i) monitor the output signals indicative of a plurality of vehicle factors, (ii) provide one or more control signals to be applied to components of the parking brake system to temporarily apply the parking brakes to activate an anti-rollaway feature when a first one of the plurality of vehicle factors indicates that the vehicle is unparked and at least a second one and a third one of the plurality of vehicle factors have not been met, (iii) provide a post-warning to the driver of the vehicle after the vehicle fails to park in response to a predefined maximum number of tries in attempt to park the vehicle being unsuccessful and (iv) discontinue the post-warning after a predefined time delay.

7. A parking brake apparatus according to claim 6, wherein the electronic controller is arranged to provide a post-warning to the driver of the vehicle after the parking brakes are applied in response to the first one of the plurality of vehicle factors indicating that the vehicle is unparked and the at least the second one and the third one of the plurality of vehicle factors having not been met.

8. A parking brake apparatus according to claim 7, wherein the post-warning to the driver of the vehicle is in the form of at least one of a warning lamp for the driver to visualize, a haptic signal to the driver, and an audible signal.

9. A parking brake apparatus for a vehicle having components of a parking brake system, the parking brake apparatus comprising:
a plurality of vehicle factors, wherein the plurality of vehicle factors are selected from retinal scan status, thumb imprint scan status, stop lamp switch status, key ignition switch status, seat belt status, driver-facing camera status, door status, vehicle speed status, brake pressure switch status, switch module status, engine RPM status, throttle position status, steering angle status, clutch position status, electronic controller unit status, a change in acceleration of the vehicle, and a change in position of the vehicle; and
means for applying parking brakes based upon occurrence of the plurality of vehicle factors in a predefined sequence comprising an occurrence of a combination of vehicle speed status, validity of a vehicle shutdown sequence, and loss of vehicle speed status.

10. A parking brake apparatus according to claim 9, wherein occurrence of the predefined sequence of the plurality of vehicle factors comprises occurrence of one or more vehicle interlocks being met followed by occurrence of two or more vehicle interlocks being met.

11. A parking brake apparatus according to claim 9, wherein occurrence of the predefined sequence of the plurality of vehicle factors comprises occurrence of vehicle speed status and status of at least one other vehicle factor.

12. A parking brake apparatus for a vehicle having components of a parking brake system and a number of devices providing a plurality of output signals indicative of a plurality of vehicle factors, the parking brake apparatus comprising:
a first device providing a first signal indicative of ground speed of the vehicle, wherein the first device comprises a wheel speed sensor;
a second device providing a second signal indicative of the motive status of the vehicle powertrain, where the second device comprises an engine RPM sensor that is capable of providing a sequence of signals indicative of a valid shutdown of the vehicle; and
an electronic controller arranged to automatically, without control by a vehicle driver, provide one or more control signals to be applied to components of the parking brake system to apply parking brakes when the first signal is indicative of zero ground speed of the vehicle and the second signal is indicative of the vehicle powertrain not being able to provide motive force.

* * * * *